Nov. 12, 1929.   H. W. HILL   1,735,758
MULTIFOCAL LENS
Filed June 21, 1926

Inventor
Harry W. Hill.
By Harry H. Styll.
Attorney

Patented Nov. 12, 1929

1,735,758

UNITED STATES PATENT OFFICE

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

MULTIFOCAL LENS

Application filed June 21, 1926. Serial No. 117,449.

This invention relates to improvements in multifocal lenses and has particular reference to multifocal ophthalmic lenses comprised of separate pieces of glass of different indices of refraction fused or otherwise secured together wherein at least two of the focal fields are monaxially arranged to merge so that the thickness of both fields at any place of mergence will be the same, and to the process for making the same.

The principal object of the invention is to provide a multifocal lens of a plurality of indices of refraction wherein the reading field will merge with the distance filed without appreciable thickness of the reading field at the point of mergence and wherein the center of curvature of the distance field and the effective center of curvature of the reading field will both lie on the same straight line and the said line projected will pass through the top of the reading field at the point of mergence of the two fields whereby the eye may pass from one field to the other without visual jump or displacement.

Another object of the invention is to provide a multifocal lens of a plurality of indices of refraction having one field countersunk into the other and merging therewith on a line of no appreciable thickness wherein the center of curvature of one field and the effective center of curvature of the other field are monaxially arranged.

Another object of the invention is to provide a multifocal lens of a plurality of indices of refraction having a distance field of one index of refraction, a reading field of a different index of refraction monaxially arranged with the distance field, and a third field of the same index of refraction as the distance field and of the same power as the distance field but arranged at an angle or bicentric therewith.

Another object of the invention is to provide a multifocal lens of a plurality of indices of refraction having two fields of the same index of refraction and power arranged at an angle to each other and a third field of different index of refraction and power monaxially arranged with one of the other fields.

Another object of the invention is to provide a multifocal lens of a plurality of indices of refraction having two fields of the same index of refraction arranged at an angle to each other and a third field of different index of refraction monaxially arranged with one of the other fields.

Another object of the invention is to provide an improved process for making a multifocal lens of this character that will be simple, economic and expedient in operation.

Another object of the invention is to provide a multifocal lens of a plurality of indices of refraction wherein a field having a boundary of no appreciable thickness is fused into another field so that the two fields may be monaxially arranged.

Another object of the invention is to provide a multifocal lens of a plurality of indices of refraction in which the various fields merge one into the other so that the thickness of the lens at any point on a line of mergence will be the same for both fields.

Other objects and advantages of the invention will become apparent from the following description taken in connection with the accompanying drawings, in which the preferred forms only have been shown and described by way of illustration. It will also be apparent that many changes in the arrangement of parts, details of construction and steps of the process may be made without departing from the spirit of the invention as expressed in the accompanying claims; therefore I do not wish to limit my invention to the exact details shown and described.

Referring to the drawings in which similar characters of reference denote corresponding parts throughout:

Figure 1:
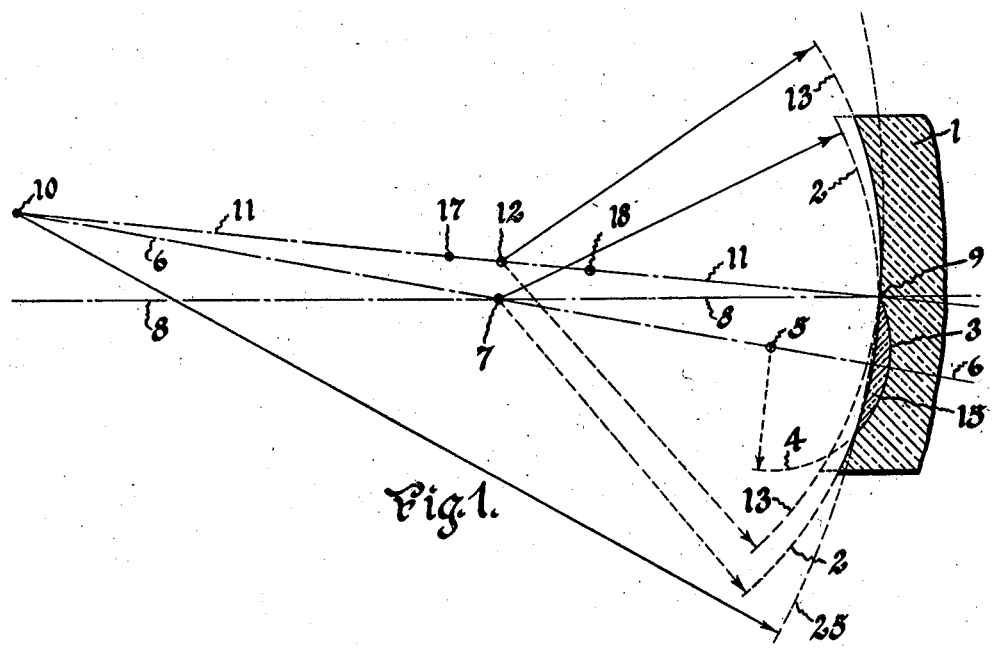
Figure 1 is a diagrammatic cross section in elevation showing the generation of the multifocal side of the invention.

Multifocal lenses, particularly bifocal lenses, made of a plurality of pieces of glass of different indices of refraction fused together have been in use for a number of years in great commercial quantities. In this type of lens the distance field had a countersink into which was fused the reading field of a different index of refraction, the two fields being finished off to a common curvature. This lens, however, was bicentric, that is, there was one optical center for the distance field and another for the reading field. There was hence a jump or displacement of vision when passing from one field to the other. Attempts were made to overcome this jump or displacement by changing or arranging the angle of the reading field with respect to the distance field to throw the optical centers of both fields on the line of joinder of the two fields. This, however, made it necessary to place the center on the thickest part of the countersunk reading field near the center of the distance field, and changed the shape of the reading field from circular to a semicircular contour and left a thick shoulder of the reading portion projecting inwardly into the distance portion at the top of the reading portion instead of the original contour of the reading portion which had no appreciable thickness but merged practically on a knife edge all around the margin of the reading field. This thick shoulder formed a light reflecting plane within the lens that caused a glare spot and looked like a crack in the lens. It was most expensive to make as it required double fusing and its appearance was such that the patient would not wear it. In the present invention the knife edge contour is retained, the thick shoulder is eliminated and a monaxial or jumpless lens is obtained without the previous difficulties of manufacture and the previous defects of vision and appearance, thus obtaining, so far as I am aware, for the first time, a monaxial multifocal having a plurality of fields of different indices of refraction with a knife edge countersunk reading field.

In making the lens of the invention I proceed as follows, using for example a multifocal lens blank having a surface power for the distance portion of minus six diopters with a reading addition of three diopters. I make the distance portion of crown glass with index of refraction of 1.523 and the reading portion of flint glass of index of refraction of 1.616. The radius of the distance portion on the bifocal side of the lens blank is:

$$\frac{0.523 \text{ index of glass minus index of air}}{6.00 \text{ power of distance surface required}}$$

equals 0.0872 meters, equals 87.2 millimeters.

The addition factor in determining the radius of the countersink for the reading field is:

$$\frac{1.616 \text{ index of flint} - 1.523 \text{ index of crown}}{1.523 = \text{index of crown} - 1.00 \text{ index of air}} = 0.177.$$

The power difference is:

$$\frac{3.00 \text{ diopters reading addition}}{0.177 \text{ addition factor}} = 17 \text{ diopters}.$$

Add original surface power 6.00 diopters to 17 diopters equals 23 diopters, which is the surface power of the countersink in the crown glass and whose radius is therefore $$\frac{0.523}{23}$$

equals 0.0228 meters equals 22.8 millimeters.

The equivalent effective radius of the reading portion if made entirely of crown instead of being a combination of two glasses, flint and crown, is:

−6.00 diopter surface power +3 addition required equals −3 diopters surface power at the reading portion which gives us for the radius $$\frac{0.52}{3}$$

equals 0.174 meters, equals 174 millimeters.

Having determined the radii for the various curves as above I mold a blank 1 of crown glass of index of refraction 1.523 to approximately the curvature 2, i. e., 87.2 millimeters radius, and then grind out and polish the countersink 3 to the curvature 4 of 22.8 millimeters radius with the center 5 on the line 6—6 and then fuse the minor portion 15 of index of refraction 1.616 into the countersink 3 and then grind off and polish the face of the blank 1 over both the distance and reading field to the curvature 2 with the radius of 87.2 millimeters about the center 7, the line 6—6 passing through the center 7 and the center 7 lying on the horizontal axis line 8—8 passing through the point 9 at the top of the countersink 3.

I next determine the effective equivalent radius of the addition for the reading field as described above which is 174 millimeters; the center of this effective curvature will lie on the line 6—6 at 10. This effective equivalent radius will be the distance from the center 10 to the line 25 which passes through the point 9, i. e., the distance from 10 to 9. In other words, the power of the addition at the reading field which is a combination of the index of refraction of the crown glass 1, the index of refraction of the flint glass 15, the curvature of the countersunk surface 3, and the curvature 2 is the same as if the reading field had all been made of the crown glass alone with the curvature 25 over the segment 15, which curvature 25 has the center 10; hence the center 10 is the effective equivalent center of the reading portion on the bifocal side.

Figure 2:
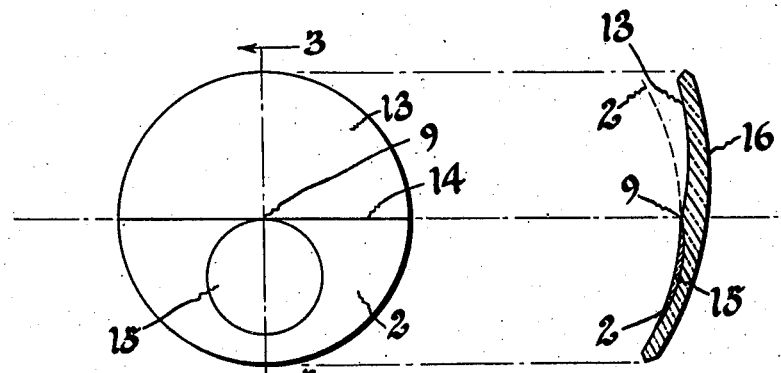
Figure 2 is a plan view of the multifocal side of the invention.
Figure 3:
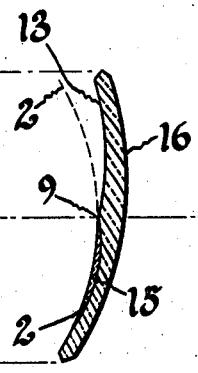
Figure 3 is a cross section on line 3—3 of Figure 2.

Now, to make the blank monaxial to prevent jump and displacement when going from the distance field to the reading field, the effective center 10 of the addition and the center of the distance field must lie on a line 11—11 passing through the joinder of the two fields or at the top of the reading field which is the point 9. In my preferred form I make the radius of the distance field the same as the original curvature 2, i. e., 87.2 millimeters. This center will fall at the point 12 in the line 11—11. About this center I grind off and polish the curvature 13. My blank now has the curvature 13 on the upper part, and the curvature 2 on the lower part, and the line of joinder between the two will be a straight line 14, Figure 2, and the centers 10 and 12 will lie on the line 11—11 passing through the point 9 where the two fields touch, fulfilling the requirements of a multifocal monaxial lens. There will be no jump in vision when passing from field 13, the distance field, to the addition 15 in the countersink 3. The prescription curve 16, Figure 3, may then be ground and polished on the opposite side of the blank to give the desired prescriptive power of the finished lens, and the lens cut, shaped, bevelled and drilled to suit the mounting into which it is to be placed.

It will be seen that the lens blank will have three fields, i. e., an upper distance field 13, a lower distance field 2 of the same power as the first field but at a different angle as respects the reading field, and a reading field through the section 15 in the countersink 3. The optical center of the distance field may be placed where prescribed without affecting the monaxial properties of the lens.

Figure 4:
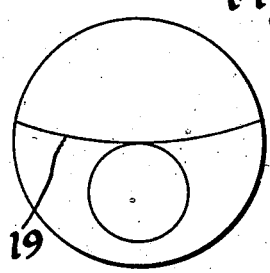
Figure 4 is a plan view of a lens of the invention having an up curve line of division between the fields.
Figure 5:
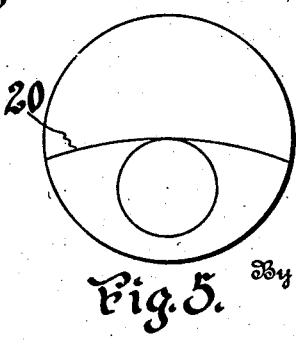
Figure 5 is a plan view of a lens of the invention having a down curve line of division between the fields.

It is not necessary to make the curvature 13 the same as the curvature 2. It can be made weaker or stronger as desired, the center moving along the line 11—11, however, to make it fulfill the requirements of a monaxial lens. This will also affect the shape of the field itself, for instead of being straight like line 14 it will be curved upwardly as 19 in Figure 4 or downwardly like line 20, Figure 5, depending upon the relative strengths of the distance field and the second field.

In making the lens, I use prior art grinding machines and laps well known for many years in the production of fused bicentric bifocals. I fuse the two parts together in the usual prior art manner. Then I grind off and polish the curve 2 in the same way the prior fused bifocals are done, and then I grind off and polish the curvature 13 with its center of curvature on the line 11—11 for the required monaxial relationship heretofore described. The second or prescription side is finished with the usual prior art machines and tools. The lenses are cut, edged, bevelled, drilled and fitted in the same way other lenses are done.

This lens lends itself to marginal correction of the distance field and to correction for astigmatic error in the section 15, exactly the same as the prior art fused bicentric bifocals. The distance field may be ground to curvature to correct marginal errors of astigmatism, of focus, or of both or either, as is known in the art, and inherent astigmatic variation in the countersink portion 15 may be corrected by grinding the countersink in toric form, i. e., a different curvature in the two major meridians, or by bending the blank when heated over a toric mold to distort the countersink portion, or by putting neutralizing toric curves on both sides of the lens, as is known in the art. This correction also may be made both for the crown and flint sections where they overlie in the reading field as is also known in the art.

The prescription curve 16 may be spherical, cylindrical, toric or aspheric or any curve to give the required prescription power.

While the bifocal side is shown and described as being on the concave side of the lens blank, it will be understood that the bifocal side may be placed on the convex side of the lens blank with no departure from the principles herein described. Crown glass and flint glass have been described by way of illustration as the lens media of the invention; however, it is not limited to these two particular kinds of glass but the distance portion must be made of a glass of moderately low index of refraction regardless of its dispersion, and the reading segment of a glass of higher index of refraction regardless of its dispersion so that the dispersions may be selected to reduce the normal chromatic aberration which exists when the ordinary crown and flint glasses are used.

From the foregoing description it will be seen that I have provided a multifocal lens of a plurality of indices of refraction in which there is no jump or displacement in vision in going from one field to the other, the thickness of the fields at any one point of mergence being identical, and that the lines of merger are without difference in level, that there is no thick shoulder in the countersunk portion to reflect light and disturb vision, and that I have provided a process for making this lens that is practically as simple and inexpensive as making the prior art fused bicentric bifocals with the usual tools and machines.

Having described my invention, I claim:

1. The method of making a multifocal lens comprising securing a segment of glass of one index of refraction to a larger piece of glass of a different index of refraction, finishing off one side of the two pieces of glass to a common optical surface and finishing off a portion of the larger piece of glass on the surfaced side beyond the segment to a different optical surface the center of curvature of which lies on a straight line passing through the effective equivalent center of curvature the the segment portion and the top edge of the segment.

2. The method of making a multifocal lens comprising securing a segment of glass of one index of refraction to a larger piece of glass of a different index of refraction, finishing off one side of the two pieces of glass to a common optical surface and finishing off a portion of the larger piece of glass on the surfaced side beyond the segment to a different optical surface the center of curvature of which lies on a straight line passing through the effective equivalent center of curvature of the segment portion and the top edge of the segment, the radius of curvature of the two surfaces being the same.

3. The method of making a multifocal lens comprising securing a segment of glass of one index of refraction to a larger piece of glass of a different index of refraction, finishing off one side of the two pieces of glass to a common optical curvature and finishing off a portion of the larger piece of glass on the surfaced side beyond the segment to an optical surface monaxially arranged as respects the segment portion.

4. The method of making a multifocal lens comprising securing a segment of glass of one index of refraction to a larger piece of glass of a different index of refraction, finishing off one side of the two pieces of glass to a common optical curvature and finishing off a portion of the larger piece of glass on the surfaced side beyond the segment to an optical surface monaxially arranged as respects the segment portion and of the same radius of curvature as the first finished surface.

5. The method of making a multifocal lens comprising securing a segment of glass of one index of refraction to a larger piece of glass of a different index of refraction, finishing off one side of the two pieces of glass to a common optical surface, finishing off a portion of the larger piece of glass on the surfaced side beyond the segment to a different optical surface the center of curvature of which lies on a straight line passing through the effective equivalent center of curvature of the segment portion and the top edge of the segment, and finishing off the other side to an optical surface to give the required prescriptive power of the lens.

6. The method of making a multifocal lens comprising securing a segment of glass of one index of refraction to a larger piece of glass of a different index of refraction, finishing off one side of the two pieces of glass to a common optical surface, finishing off a portion of the larger piece of glass on the surfaced side beyond the segment to a different optical surface the center of curvature of which lies on a straight line passing through the effective equivalent center of curvature of the segment portion and the top edges of the segment, the radius of curvature of the two surfaces being the same, and finishing off the other side to an optical surface to give the required prescriptive power of the lens.

7. The method of making a multifocal lens comprising securing a segment of glass of one index of refraction to a larger piece of glass of a different index of refraction, finishing off one side of the two pieces of glass to a common optical curvature, finishing off a portion of the larger piece of glass on the surfaced side beyond the segment to an optical surface monaxially arranged as respects the segment portion, and finishing off the other side to an optical surface to give the required prescriptive power of the lens.

8. The method of making a multifocal lens comprising securing a segment of glass of one index of refraction to a larger piece of glass of a different index of refraction, finishing off one side of the two pieces of glass to a common optical curvature, finishing off a portion of the larger piece of glass on the surfaced side beyond the segment to an optical surface monaxially arranged as respects the segment portion and of the same radius of curvature as the first finished surface, and finishing off the other side to an optical surface to give the required prescriptive power of the lens.

9. A multifocal lens comprising on one side thereof a small segment of glass secured to a larger piece of glass of different index of refraction, both pieces of glass having a common optical curved surface and a second optical curved surface merging with the first surface, the center of curvature of said second surface lying on a straight line passing through the effective equivalent center of curvature of the small segment and the top edge of the small segment.

10. A multifocal lens comprising on one side thereof a small segment of glass secured to a larger piece of glass of different index of refraction, both pieces of glass having a common optical curved surface and a second optical curved surface merging with the first surface, the center of curvature of said second surface lying on a straight line passing through the effective equivalent center of curvature of the small segment and the top edge of the small segment and having a surface on the other side thereof that will give the required prescriptive power of the finished lens.

11. A multifocal lens comprising on one side thereof a small segment of glass secured to a larger piece of glass of different index of refraction, both pieces of glass having a common optical curved surface and a second optical curved surface merging with the first surface, the center of curvature of said second surface lying on a straight line passing through the effective equivalent center of curvature of the small segment and the top edge of the small segment, the radius of curvature of the two surfaces being the same.

12. A multifocal lens comprising on one side thereof a small segment of glass secured to a larger piece of glass of different index of refraction, both pieces of glass having a common optical curved surface and a second optical curved surface merging with the first surface, the center of curvature of said second surface lying on a straight line passing through the effective equivalent center of curvature of the small segment and the top edge of the small segment, the radius of curvature of the two surfaces being the same and having a surface on the other side thereof that will give the required prescriptive power of the finished lens.

13. A multifocal lens comprising on one side thereof a small segment of glass secured to a larger piece of glass of different index of refraction, both pieces of glass having a common optical curved surface and a second optical curved surface at an angle to but merged with the first surface and monaxially arranged as respects the small segment portion.

14. A multifocal lens comprising on one side thereof a small segment of glass secured to a larger piece of glass of different index of refraction, both pieces of glass having a common optical curved surface and a second optical curved surface at an angle to but merged with the first surface and monaxially arranged as respects the small segment portion and having a surface on the other side thereof that will give the required prescriptive power of the finished lens.

15. A multifocal lens comprising on one side thereof a small segment of glass secured to a larger piece of glass of different index of refraction, both pieces of glass having a common optical curved surface and a second optical curved surface at an angle to but merged with the first surface and monaxially arranged as respects the small segment portion and of the same radius of curvature as the first surface.

16. A multifocal lens comprising on one side thereof a small segment of glass secured to a larger piece of glass of different index of refraction, both pieces of glass having a common optical curved surface and a second optical curved surface at an angle to but merged with the first surface and monaxially arranged as respects the small segment portion and of the same radius of curvature as the first surface, and having a surface on the other side thereof that will give the required prescriptive power of the finished lens.

17. The process of making a monaxial multifocal lens having a plurality of focal fields of lens material of different indices of refraction comprising securing a relatively small piece of lens material of one index of refraction upon a relatively large piece of lens material of different index of refraction so that the small piece will overlie a portion of the large piece and both will have a common optical surface, and finishing off a portion of said surface confined to the larger piece to another optical surface at an angle to the first about a center of curvature lying on a straight line passing through a point common to the two pieces and a point that would be the center of curvature of an optical surface of the same power of field as that of the overlying pieces if the field of the overlying pieces were made of the large piece alone and similarly located and arranged.

18. A multifocal monaxial lens having a plurality of focal fields of lens material of different indices of refraction comprising a relatively small piece of lens material secured on a relatively large piece of lens material of different index of refraction, both pieces having a common optical surface, said large piece having another optical surface at an angle to the common surface and constructed about a center of curvature lying on a straight line passing through a point common to the two pieces and a point that would be the center of curvature of an optical surface of the same power of field as that of the overlying pieces if the field of the overlying pieces were made of the large piece alone and similarly located and arranged.

HARRY W. HILL.